United States Patent [19]

Schneck et al.

[11] Patent Number: 4,504,500
[45] Date of Patent: Mar. 12, 1985

[54] METHOD OF COATING A SHIRRED CASING STRAND WITH SMOKE FLAVOR

[75] Inventors: James C. Schneck; Patrick J. Ford, both of Manitowoc, Wis.

[73] Assignee: Red Arrow Products Company Inc., Manitowoc, Wis.

[21] Appl. No.: 408,833

[22] Filed: Aug. 17, 1982

[51] Int. Cl.³ .................. A22C 11/00; A22C 13/02
[52] U.S. Cl. .................. 426/265; 138/118.1; 206/802; 426/105; 426/135; 426/140; 426/284; 426/413; 428/36
[58] Field of Search ............... 426/90, 92, 105, 135, 426/138, 140, 262, 282, 284, 314, 315, 650, 412, 413, 302, 265; 427/230, 235, 238; 428/36; 138/118.1; 206/802

[56] References Cited

U.S. PATENT DOCUMENTS

| 2,125,025 | 7/1938 | Huckfeldt et al. | 427/238 X |
| 3,106,473 | 10/1963 | Hollenbeck | 426/650 |
| 3,330,669 | 7/1967 | Hollenbeck | 426/302 |
| 3,451,827 | 6/1969 | Bridgeford | 427/238 X |
| 3,661,621 | 5/1972 | Jager | 427/238 X |
| 4,278,694 | 7/1981 | Chiu | 426/135 |

*Primary Examiner*—Arthur L. Corbin
*Attorney, Agent, or Firm*—Marshall, O'Toole, Gerstein, Murray & Bicknell

[57] ABSTRACT

A method of coating at least the internal or external surface of a shirred casing strand for foodstuffs with a smoke flavor comprising placing a liquid smoke flavor solution in contact with a shirred casing strand; applying a pressure to the solution so that the smoke solution is forced to flow between the pleats or folds of the casing and thereby coats the surface of the casing in shirred form.

A shirred casing coated by this method is also provided.

8 Claims, 8 Drawing Figures

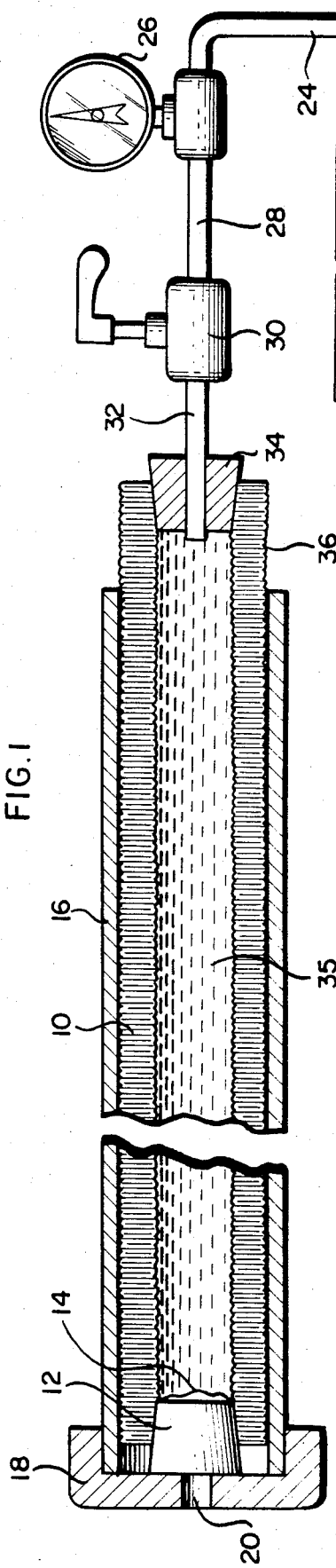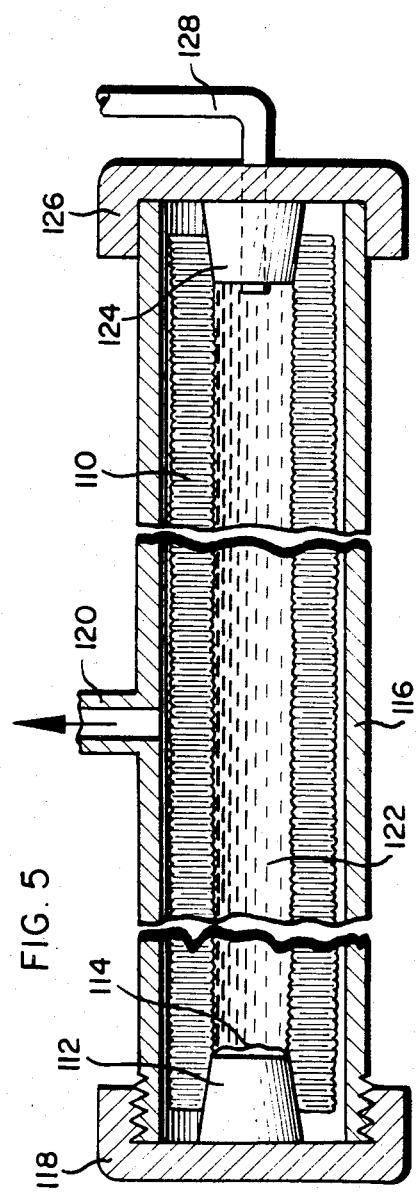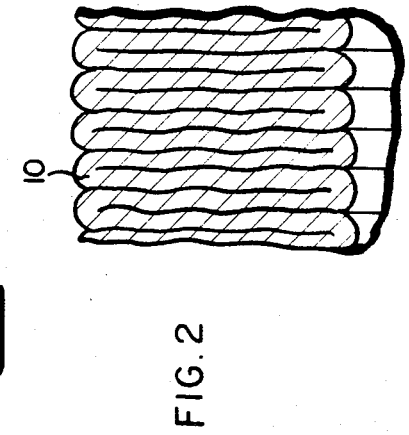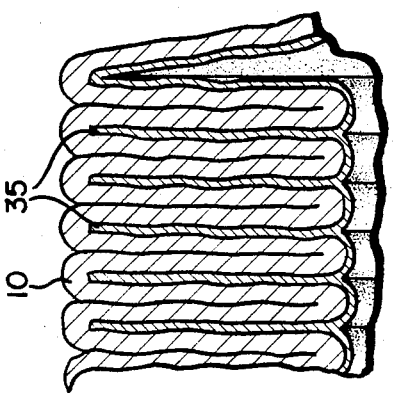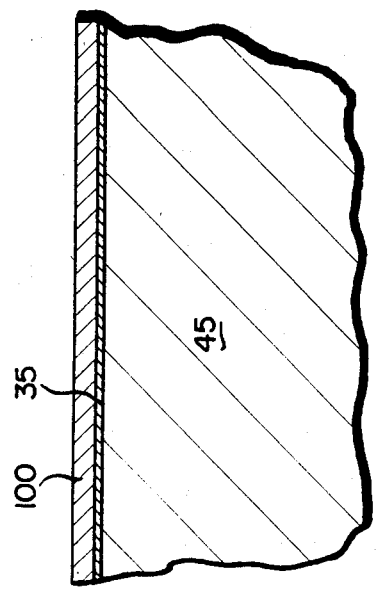

METHOD OF COATING A SHIRRED CASING STRAND WITH SMOKE FLAVOR

This invention relates to methods of smoking foodstuffs. More particularly, this invention is concerned with a novel process of imparting smoke flavor and surface color to processed meats and the coating of shirred casing strands with liquid smoke.

BACKGROUND OF THE INVENTION

Some processed meat products contain whole or partial muscle groups, and/or ground and emulsified meat. These products which may also contain spices, bacteriostats, binders and other additives are stuffed into a casing and then cooked, followed by cooling and storage at a low temperature. In the manufacture of some of these meat items the cooking also involves smoking or smoke flavoring. Examples of these processed meats which are stuffed into casings are sausage meats, ham products and various poultry products.

Because of environmental concerns, as well as capital costs, it has been considered advisable to substitute various liquid smoke products for smoke house processing in order to impart smoky flavor to the meat. Hollenbeck U.S. Pat. No. 3,330,669 discloses production of a widely used commercial aqueous smoke solution of natural flavors from wood smoke. Although the liquid smoke could be added directly to the meat formulation before it is stuffed in a casing, the liquid smoke added in this manner will not impart the desired smoke or brown color to the meat surface.

It has been proposed previously to coat the inside of a meat formulation casing, before it is shirred, with a liquid smoke solution, release agents, gelatin, sugars, albumin, amino acids and other materials. Shiner et al U.S. Pat. No. 3,378,379 discloses a slugging or bubble method of coating an unshirred casing. The coating is dried and the casing stored. Bridgeford U.S. Pat. No. 3,451,827 discloses the application of liquid smoke solution through a hollow mandrel to the internal surface of a casing as it is being shirred. The coated casing is then shirred into a tightly compacted accordion pleated form.

The above-described methods of coating a casing with smoke flavoring involve expensive equipment and very carefully controlled operations. Furthermore, they are not methods readily performed by a meat processor so that he must buy the casing pre-coated rather than coat it as and when needed. Since a meat processor may want to use a casing that is not smoke coated for certain meat products, it would be advantageous for him to purchase and stock only uncoated casing and to coat only that amount of casing needed by him for particular types of processed meats.

SUMMARY OF THE INVENTION

According to one aspect of the invention, there is provided a method of coating a shirred casing strand which comprises contacting at least one of the internal or external surfaces with a liquid smoke flavor, desirably with a pressure applied to the solution which induces flow of the smoke solution between the folds of the shirred casing.

When only one side of the casing is to be coated, the liquid smoke flavor solution can be placed in contact with at least one surface of the shirred casing strand; a pressure differential created between the shirred casing internal and external surfaces, with the higher pressure being on the side contacted by the smoke solution, sufficiently great so that the smoke solution is forced to flow between the pleats or folds of the casing and thereby coat essentially the entire surface of the casing, in shirred form, in contact with the liquid smoke; and following that the pressure differential can be eliminated.

Although both sides of a shirred casing can be separately coated sequentially using the described process, it is more efficient to coat both sides simultaneously by contacting both sides of the casing with a liquid smoke solution at the same time, desirably with the application of increased pressure to the solution on one or both sides.

The shirred casing strand is desirably surrounded or circumscribed with means which holds the shirred casing when pressure is applied to the smoke solution. A sufficiently strong tube, either rigid or flexible, can be used for this purpose. A plastic tube of polyvinylchloride may be employed for the described purpose. When an increased internal pressure is applied the casing should fit snugly in the tube to prevent the casing from expanding longitudinally and diametrically.

Although a vacuum can be developed around the outside of the shirred casing strand when the liquid solution is placed inside the shirred casing strand, and the internal pressure can be provided by atmospheric pressure or a supra-atmospheric pressure, it is generally more practical for atmospheric pressure to be applied to the external surface of the casing strand and for a supra-atmospheric pressure to be applied internally. In this regard, the supra-atmospheric pressure generally should be at least 0.5 psig and desirably at least 5 psig. At present, it is believed a pressure in the range of about 10 to 60 psig is preferred with a pressure of 20 psig considered most suitable. In practicing the process, the shirred casing strand can be filled with liquid smoke and then subjected to an increased internal pressure. The desired pressure can be applied by a pressurized gas, such as air or nitrogen, or hydraulically by means of liquid smoke itself.

Alternatively, the external surface of a shirred casing strand can be surrounded by the liquid solution and increased pressure applied externally, with or without reduction of the pressure inside the strand. A plastic tube as described above can be used for this process to hold the strand.

When both sides of a shirred casing strand are to be coated the shirred casing strand can be surrounded by the solution, with or without the application of an increased pressure to one or both sides. Specifically, the strand can be placed in a tube as described above, the tube filled with enough of the coating solution to immerse the strand and then closed, and the solution in the tube pressurized. In this way the solution is forced between the folds from both sides simultaneously by the increased pressure. Of course, the pressure need not be the same on both sides, whether increased on both sides or not (i.e. above atmospheric pressure). When both sides are coated as described a vacuum can be used to remove air from between the folds before the solution is placed in contact with the casing internal and external surfaces.

Since the pleats or folds of a shirred casing strand are pressed tightly together, flow of liquid smoke into the pleats takes considerably longer at lower, than at higher, differential pressures. At lower pressures, it may take 30 min. or longer while at pressures of 10 to 60 psig the coating can be completed in 3 sec. to 2 min.

Not only is the coating time reduced as the pressure differential increases, but the amount of liquid smoke applied to the casing increases with pressure application time until no more liquid can be retained by the casing. Thus, at 20 psig and 10 sec., about 1.4 ml of liquid smoke is coated on one side of a size 25 frankfurter shirred casing strand per inch of strand while at the same pressure but 120 sec. about 2.7 ml of liquid smoke is applied per strand inch. A coating of about 2 ml/in is equal to about 4 oz. of liquid smoke per 100 lbs. of meat. Such a concentration imparts a good smoke flavor to the meat.

Any suitable liquid smoke solution can be used in the process. However, aqueous liquid smoke obtained by the method of the Hollenbeck patent, supra, from wood, particularly hickory and hard maple, with higher concentrations of smoke ingredient, is preferred. If desired, adjuncts can be included in the smoke solution to impart other properties to the meat product.

The liquid smoke solution is desirably used at room temperature although it can be cooled or warmed as may be desirable.

Any of the commercially used shirred casing strands can be coated by the described process. Representative of the casing which may be coated are cellulose casings, fibrous casings and collagen casings. Collagen casings are best used while still wet with the liquid smoke coating since they become tanned by the smoke and soften and once dry they have reduced strength.

After the shirred casing strand is coated with the liquid smoke, any pressure differential can be eliminated. The coated shirred casing strand can then be partially dried to concentrate the adhered smoke solution before use or preferably it can be put to use without delay while still wet and stuffed with the meat product. As the casing is unshirred and stuffed, a uniform internal coating of liquid smoke is transferred from the casing surface to the surface of the meat. When the coating is applied only to the external surface of the casing, the subsequent holding and cooking results in migration of the coating through the casing to the meat product in a manner comparable to migration of vaporous smoke through casings containing meat in an old-fashioned smoke house. Furthermore, when both sides of the strand are coated as described the meat becomes flavored and colored by both these means.

Following stuffing, the meat product can be cooked, cooled and stored using conventional operating conditions. Of course, for skinless sausage, such as skinless frankfurters, the casing is removed from the sausage after cooking and cooling.

Smoked meat products prepared as described have a delectable smoky flavor and a uniform brown surface color which increases the acceptability of the products. Furthermore, the coating increases the peelability of the casing, if desired, from the cooked meat item.

Some of the advantages of the process of the invention over prior processes can be summarized as follows:

1. Very controlled application of smoke flavor to the surface of the meat product.
2. More efficient application of smoke flavor to the meat product as the smoke flavor is in direct contact with the meat surface. (No surface barrier is present).
3. Elimination of special coated casings to aid in peelability.
4. Elimination of special coated casings to impart a smoke color or flavor.
5. Elimination of the necessity to neutralize the acids in smoke solution as is recommended in pre-dried smoke coated casings.
6. Elimination of shelf life problems associated with presmoked cellulose casings such as excessive breakage.

BRIEF DESCRIPTION OF THE DRAWINGS

FIG. 1 is a vertical view, partially in section, of one embodiment of apparatus useful for practicing the invention;

FIG. 2 is a sectional view through a wall portion of a shirred casing strand which is not coated;

FIG. 3 is a sectional view through a wall portion of a shirred casing strand which has been internally coated, while shirred, pursuant to the invention;

FIG. 4 is a sectional view of the casing of FIG. 3 after it has been stuffed with a foodstuff, such as a sausage formulation;

FIG. 5 is a vertical partial sectional view of a second embodiment of apparatus, useful for practicing the invention, which employs a vacuum to create a differential pressure across a shirred casing strand wall;

DETAILED DESCRIPTION OF THE DRAWINGS

Figure 6:
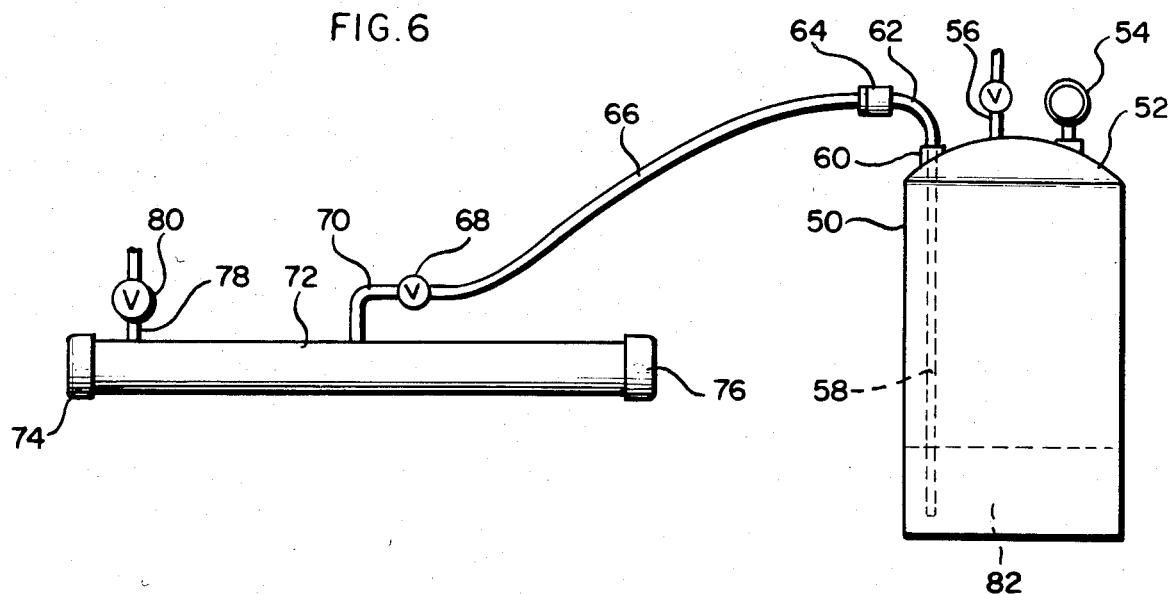
FIG. 6 is an elevational view of apparatus which can be used to coat the exterior of a shirred casing, as well as to coat simultaneously the interior and exterior of a shirred casing.

To the extent it is reasonable and practical, the same elements or parts which appear in the various views of the drawings will be identified by the same numbers.

With reference to FIG. 1, shirred casing strand 10, such as a regenerated cellulose casing, is fitted with a stopper 12 at the closed end 14 of the shirred casing. The shirred casing strand 10 is positioned in plastic tube 16 which desirably is made of a noncorroding material. The inside of tube 16 is only very slightly larger than the shirred casing diameter so that it restricts expansion of the casing when it is subjected to a pressure differential. Cap 18 is secured on one end of tube 16. The end of stopper 12 is positioned in contact with the inside of the cap. Hole 20 is provided in stopper 12 so that a rod, not shown, can be inserted and be used to press against stopper 12 so as to force the slightly enlarged casing 10 out of the tube 16 after the casing is internally coated with liquid smoke.

Conduit 24 extends from compressed air tank 22 to pressure gauge 26. Conduit 28 communicates with gauge 26 and valve 30 from which conduit 32 extends. Stopper 34 is positioned on the end of conduit 32.

To internally coat shirred casing strand 10 using the apparatus described above in conjunction with FIG. 1, liquid smoke 35, or some other liquid material to be applied to the casing internal surface, is poured into the shirred casing until it is nearly full. Then stopper 34 is inserted into the open end of the casing. A portion 36 of the open end of the casing extends past the adjacent open end of tube 16 so that the casing and adjacent stopper 34 can be gripped with one hand to keep the stopper in place when pressure is applied to the casing interior by opening valve 30. Cap 18 is butted against a stationary base before valve 30 is opened so as to facilitate maintaining tube 16 in steady position. With tank 22 containing air at 20 psig it is thus a simple matter to open valve 30 and thereby apply super-atmospheric pressure on the liquid smoke 35 inside of the shirred casing strand 10. In a very short time the liquid smoke 35 is forced by the pressure into the space between the closely packed and contacting folds and pleats of the shirred casing strand.

FIG. 2 illustrates the shirred casing strand 10 before it is coated while FIG. 3 shows the same strand after it has been internally coated with liquid smoke 35 using the apparatus illustrated in FIG. 1.

Once the shirred casing strand has been internally coated with liquid smoke 35, valve 30 is closed and stopper 34 is slowly withdrawn from the casing end. Excess liquid smoke, or other coating liquid which may be used, is then poured from the casing. The casing will generally have slightly enlarged diametrically because of the increased internal pressure to which it has been subjected. Accordingly, to facilitate removing the coated casing from tube 16 a rod, not shown, is inserted through hole 20 in cap 18 and pressed against stopper 12 to slide it out of the tube. This is very easily accomplished with only a small force applied to the rod.

After the casing has been coated as described, it can be used wet immediately and stuffed with a foodstuff formulation, such as a sausage emulsion, starting at the closed end 14 of the casing. FIG. 4 shows the coated shirred casing strand of FIG. 3 after it has been stuffed with a frankfurter emulsion 45. The liquid smoke coating 35 is evenly distributed between the casing 100 and the frankfurter emulsion surface. As a result, the liquid smoke is able to color the frankfurter surface a uniform smoky brown color and to impart an even smoke flavor to the product.

FIG. 5 illustrates a second embodiment of apparatus which can be used in practicing the invention. Shirred casing strand 110 is fitted with stopper 112 on the closed end 114 of the casing. The casing is then placed in plastic tube 116 which has a permanent cap 118 at one end. Conduit 120 communicates with the interior of tube 116 and a vacuum source, not shown. Liquid smoke 122 is poured into casing 110 to just about fill it. Stopper 124 is then inserted into the open end of casing 110. Removable cap 126 is then positioned tightly on the end of tube 116. Conduit 128 is then inserted through a hole in cap 126 into a hole in stopper 124. The outer end of conduit 128 is left open to atmospheric pressure but it is located high enough to prevent the liquid smoke from running out of the casing 110. In this connection, extra liquid smoke can be poured into conduit 128 so that an amount is available to keep the casing full.

A vacuum is created in tube 116, around the outside of shirred casing strand 110, by means of conduit 120 which communicates with a vacuum source. The liquid smoke 122 inside the casing remains at atmospheric pressure since the end of conduit 128 is open to the atmosphere. As a result, a differential pressure is created across the wall of the shirred casing and the liquid smoke is thereby forced between the folds and pleats of the casing. Generally, a vacuum of about $-5$ to $-8$ psig is adequate, especially since most casing materials have a porosity which aids in removal of air from the casing pleats or folds and movement of the liquid into the casing internal space vacated by the air. Once the casing interior has been coated the vacuum can be discontinued and the casing removed from the apparatus. The coated shirred casing strand can then be stuffed while wet with a foodstuff. Alternatively, the casing can be dried or partially dried before it is stuffed.

FIG. 6 illustrates apparatus which can be used to coat only the external surface, or to simultaneously coat the internal and external surfaces, of a shirred casing. As shown in FIG. 6, pressure tank 50 is equipped with a removable cover 52, pressure gauge 54 and valved inlet conduit 56 for introducing a pressurizing gas into the tank. Pipe 58 extends from near the bottom of tank 50 to fitting 60 mounted on cover 52. Elbow 62 has its lower end connected to fitting 60 and its upper end is joined to coupling 64. Flexible hydraulic hose 66 extends from coupling 64 to a nipple connection on valve 68. Valve 68 is connected to one end of elbow 70 and the other end of elbow 70 is joined to tube 72. Tube 72 is closed at one end by permanent cap 74 while the other end is temporarily closed by removable threaded cap 76. Vent 78 communicates with the interior of tube 72 while valve 80 provides means to control flow of air and liquid from tube 72.

To use the apparatus shown in FIG. 6, a volume of liquid smoke flavoring 82 is placed in tank 50, the cover 52 is put on the tank securely and then the tank interior is pressurized by inlet 56, such as with nitrogen gas, with valve 70 closed. The apparatus can then be used to apply the liquid smoke flavoring to a shirred casing as shown in FIGS. 7 and 8.

Figure 7:
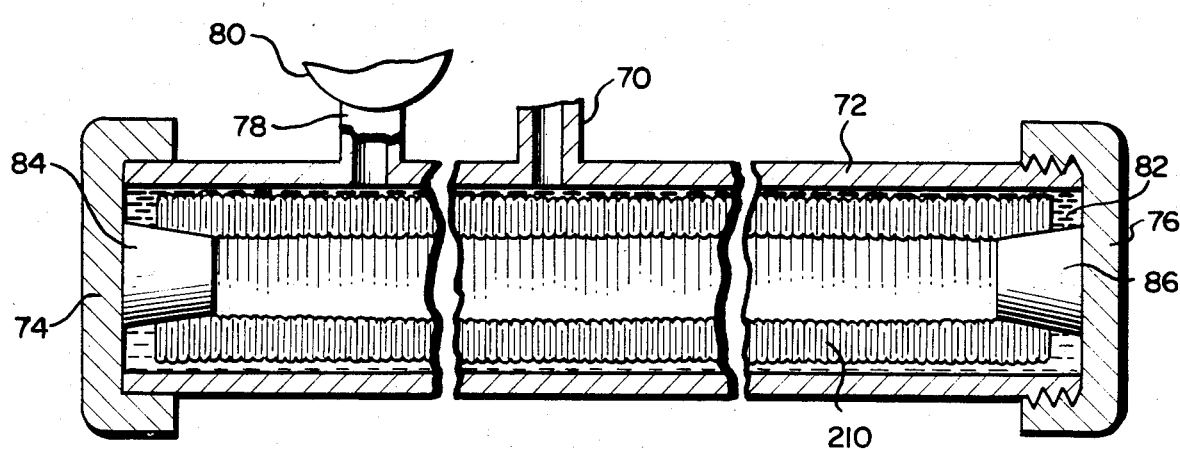
FIG. 7 is a sectional view of the tube shown in FIG. 6 with a shirred casing inside being externally coated.

With reference to FIG. 7, the cap 76 is removed and shirred casing 210, with stoppers 84 and 86 inserted in the casing ends, is positioned in tube 72. Then cap 76 is positioned tightly on tube 72. If desired, a vacuum can be drawn in tube 72 by means of vent 78. If no vacuum is drawn in tube 72, valve 80 is opened and liquid smoke solution is slowly fed to tube 72 by opening valve 68 until air in the tube and around the casing folds is substantially eliminated and the tube is filled with the smoke solution. Valve 80 is then closed. The liquid smoke in tube 72 is thereby brought into pressure equalization with the pressure in tank 50 which will usually be about 10 to 60 psig. The pressure forces the smoke solution between the shirred casing folds thereby coating the exterior surface of the casing. The casing can be subjected to the pressurized smoke solution for a sufficient time to have the solution flow between the folds. This will usually take about 1 to 10 minutes.

Figure 8:
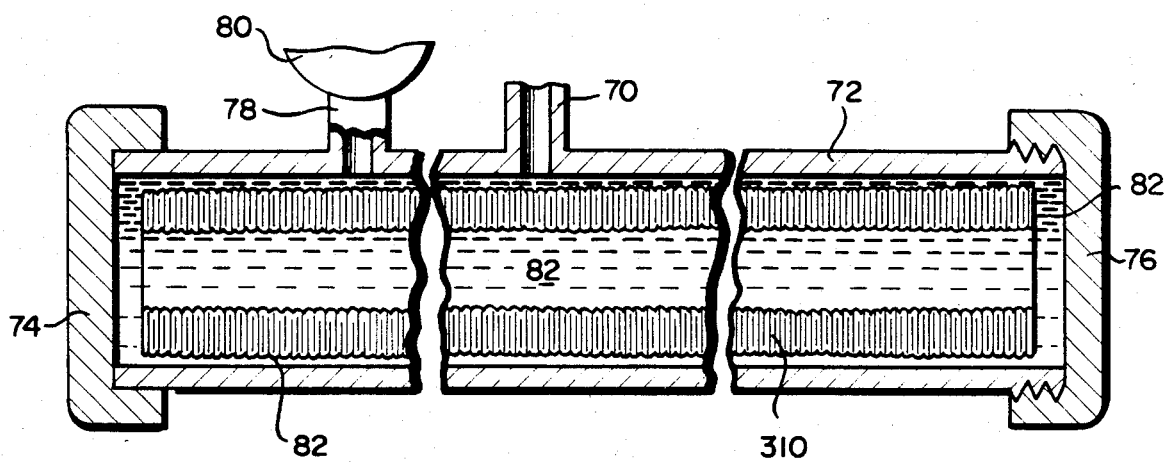
FIG. 8 is a sectional view of the tube shown in FIG. 6 with a shirred casing inside being internally and externally coated simultaneously.

FIG. 8 illustrates the simultaneous internal and external coating of shirred casing 310 with liquid smoke solution. Casing 310, with both ends open, is positioned in tube 72 and cap 76 is placed in sealing position on the tube end. Smoke solution is then fed into tube 72 as described with reference to FIG. 7 except, of course, that the solution flows both around and into the shirred casing 310. Upon application of pressure to the smoke solution in tube 72, the smoke solution flows into the folds which open to the inside as well as the outside of the casing so that the internal and external surfaces of the shirred casing are coated simultaneously.

It should be understood that the systems of FIGS. 1 and 5, and the system of FIG. 7, can be used separately to coat first the internal surface, and then the external surface, or vice versa, of a shirred casing.

Once the casing is coated as described it can be stuffed using conventional apparatus and methods.

The following examples are presented to further illustrate the invention.

EXAMPLE 1

A portable air pressure tank was slightly modified to provide a constant source of air pressure (20 psig) for coating the interior walls of shirred cellulose casings with an aqueous solution of natural wood smoke flavors (CharSol C-10 liquid smoke containing 10% total acidity and 14 mg/ml of phenolic compounds). A shirred strand of size 25 cellulose casing (22–23 mm stuffed dia.) was stoppered on one end with a number 0 stopper, filled with liquid smoke, and inserted plugged end first into a one inch diameter tube which was capped on one end. Then the open end of the casing was fitted to the air pressure tank. After the liquid smoke filled casing was subjected to 20 psig of air pressure for a specified amount of time, it was disconnected from the pressure tank and the excess or free liquid smoke poured out. The length of time that the air pressure was applied dictated the amount of liquid smoke that would remain adhered to the interior surface of the shirred casing strand. For example, when air pressure was applied for 10, 20 or 40 seconds, 1.7, 2.0 or 2.3 ml of liquid smoke respectively was retained per shirred inch of casing. A strand of casing that retains 1.7 ml of liquid smoke per shirred inch will, when stuffed with frankfurter emulsion, impart a film of liquid smoke on the surface of the emulsion equivalent to approximately 4 oz./100 lbs. of product.

Within 15 minutes after coating the interior surface of the cellulose casing with 1.7 ml of CharSol C-10 per shirred inch of casing by the method just described, the said casing was stuffed automatically with frankfurter emulsion by a DB-2 Townsend Frank-A-Matic machine with no apparent difficulties. The resulting frankfurters were processed in a thermal processing oven with a dry bulb temperature maintained at 140° F. for 45 minutes. The temperature was then raised to 160° F. for 10 min. and then to 180° F. until an internal product temperature of 160° F. was reached. The product was then cold tap-water showered to an internal temperature of 100° F. and was held in a 40° F. cooler overnight prior to removing the casing with a mechanical peeler. The finished, cooked frankfurters had an acceptable uniform brown surface color and a smoky flavor. A control product stuffed in a casing not coated with liquid smoke did not have the brown color or smoky flavor of the test product.

EXAMPLE 2

Four shirred strands of size 25 cellulose casing were internally coated with CharSol C-10 according to the method described in Example 1. One strand was immediately stuffed with frankfurter emulsion while the other three strands were air dried for 2, 15 or 96 hours to concentrate the adhered smoke solution before attempting to stuff them with sausage emulsion. All but the strand of casing air dried for 96 hours were stuffed with ease on a DB-2 Frank-A-Matic. The strand of casing air dried for 96 hours broke at the start of the stuffing operation.

The frankfurters were processed as outlined in Example 1 and the casing removed with a mechanical peeler. The finished, cooked frankfurters processed within the air dried liquid smoke coated casings had a slightly browner surface color than the frankfurters processed within the casing stuffed with emulsion immediately after coating with liquid smoke. All of the frankfurters had a very desirable smoky flavor.

EXAMPLE 3

A concentrated liquid smoke was prepared by vacuum evaporating CharSol C-10 to one-half of its original volume. The concentrated liquid smoke was used to coat a size 25 cellulose casing as described in Example 1. Frankfurters manufactured with the aid of the aforementioned casing, according to procedures mentioned in Example 1, had a browner surface color and stronger smoke flavor than the frankfurters described in Examples 1 and 12.

EXAMPLE 4

A size 25 cellulose casing was coated, with the concentrated liquid smoke described in Example 3, according to the procedure described in Example 1. Immediately after coating the casing with liquid smoke, a piece of cotton cloth three inches by three inches was pushed through the inner opening of the shirred strand with a ⅜ inch glass rod so as to wipe away the pools of excess liquid smoke. Frankfurters prepared inside this casing according to the procedure outlined in Example 1 had an acceptable brown surface color.

EXAMPLE 5

Two shirred strands of size 25 cellulose casing, one not coated with special releasing compounds to aid peeling, and one coated with special releasing compounds to aid peeling, were both internally coated with CharSol C-10, stuffed with frankfurter emulsion and heat processed according to the procedure outlined in Example 1. Both products had equal peeling characteristics.

EXAMPLE 6

Tests were conducted with E-Z peel NoJax size 25×84 ft. casings to determine the amount of liquid smoke retained per inch of shirred casing by varying the length of time but using 20 lbs. of air pressure. The shirred casing strands were filled with CharSol Poly-10 brand of liquid smoke solution. CharSol Poly-10 is the same as CharSol C-10 except that 6–7% by weight of polysorbate 80 is added. The procedure of Example 1 was followed to coat the casing internal surface with liquid smoke. The following results were obtained.

TABLE 1

| Time air pressure applied (sec.) | Av. vol. liquid smoke retained (ml/in of casing) |
| --- | --- |
| 10 | 1.4 |
| 20 | 1.8 |
| 40 | 2.2 |
| 60 | 2.2 |
| 120 | 2.7 |

EXAMPLE 7

Utilizing a predetermined length of 1¼ inch diameter PVC tube, sealed on both ends, the exterior surface of a shirred strand of cellulose casing was coated with a concentrated liquid smoke solution, prepared as described in Example 3.

A shirred strand of size 25 cellulose casing was stoppered on both ends with a number 0 stopper and then inserted into the PVC tube. The PVC tube was sealed tight and attached by means of a quick disconnect coupler to a portable pressure tank containing the liquid smoke held under 40 lbs. of air pressure. As the pressurized liquid smoke filled the space in the PVC tube around the shirred casing, the air in the tube was vented to the atmosphere by means of a valve located on top of the PVC tube. When the liquid smoke had completely displaced all of the air in the tube, the valve was closed and the exterior surface of the shirred strand was subjected to the pressurized liquid smoke for 60 seconds. By creating a pressure differential between the inside and the outside of the shirred strand, the liquid smoke was forced into the external crevices of the shirred casing strand. By subjecting the liquid smoke that is in contact with the external surface of the casing to 40 lbs. of air pressure as much as an additional 1.2 ml. of liquid smoke per inch of shirred strand can be retained on the casing as compared when the liquid smoke is subjected to only atmospheric pressure (1.6 ml/in. vs. 0.4 ml/in.).

Immediately after coating the external surface of the shirred strand with liquid smoke, the casing was stuffed with frankfurter emulsion by a DB-2 Townsend Frank-A-Matic machine. The frankfurters were processed and packaged as outlined in Example 1. The finished, cooked frankfurters had a satisfactory brown color and an acceptable smoky flavor.

EXAMPLE 8

The apparatus described in Example 7 was used to simultaneously coat both the internal and external surfaces of shirred strands of cellulose casings with concentrated liquid smoke prepared as described in Example 3. A shirred strand of casing, with both ends left unplugged, was inserted into the PVC tube. In this manner, when the pressurized liquid smoke flows into the sealed tube, it can readily come in contact with the internal and external surfaces of the casing. Using this procedure, tests were conducted with size 25×84 ft. cellulose casings to determine the amount of liquid smoke retained per inch of shirred casing by varying the length of time that the shirred strand was subjected to the pressurized liquid smoke and by varying the air pressure used to pressurize the liquid smoke. The results obtained are reported in Tables 2 and 3.

TABLE 2

| Varying time; constant air pressure (40 psig) | |
|---|---|
| Time pressurized liquid smoke applied (sec.) | Av. vol. liquid smoke retained (ml/in. shirred casing) |
| 10 | 1.4 |
| 20 | 1.5 |
| 40 | 1.4 |
| 60 | 1.7 |
| 120 | 1.9 |

TABLE 3

| Varying air pressure; constant time (60 sec.) | |
|---|---|
| Air pressure used (psig) | Av. vol. liquid smoke retained (ml/in. shirred casing) |
| 0 | 0.7 |
| 10 | 1.3 |
| 20 | 1.5 |
| 40 | 1.6 |
| 60 | 1.6 |

A shirred strand of size 25 cellulose casing that retains 1.5 ml. per shirred inch of concentrated liquid smoke will have approximately 3.7 mg/in.$^2$ of smoke solids on the casing surface.

What is claimed is:

1. A method which comprises:
    placing a liquid smoke flavor solution in contact with at least the internal or external surface of a shirred casing strand after said strand is completely shirred;
    applying an increased pressure on the shirred casing strand surface in contact with the solution so that the smoke solution is forced to flow between the pleats or folds of the casing and thereby coats essentially the entire surface of the casing, in completely shirred form, in contact with the solution;
    eliminating the pressure applied to the shirred casing strand and removing any excess liquid smoke from the casing; and
    while the casing is still wet with the liquid smoke, stuffing the casing with a meat formulation and cooking the resulting encased meat product, thereby producing a meat product with a smoke flavor and brown colored surface.

2. A method according to claim 1 in which the smoke solution is an aqueous solution of natural wood smoke flavors.

3. A method according to claim 1 in which the shirred casing strand is located in a closed container when the increased pressure is applied.

4. A method according to claim 3 in which the shirred casing strand external surface is subjected to about atmospheric pressure and the shirred casing internal surface is subjected to a pressure of at least 0.5 psig.

5. A method according to claim 1 in which the meat formulation is a frankfurter formulation.

6. A method according to claim 5 in which the cooked frankfurters are then cooled and the casing is peeled off.

7. A method according to claim 1 in which the shirred casing strand is circumscribed with means which restrains circumferential expansion of the shirred casing when the strand internal pressure is greater than the external pressure.

8. A method which comprises:
    placing a liquid smoke flavor solution in contact with at least the internal or external surface of a shirred casing strand after said strand is completely shirred;
    applying an increased pressure on the shirred casing strand surface in contact with the solution so that the smoke solution is forced to flow between the pleats or folds of the casing and thereby coats essentially the entire surface of the casing, in completely shirred form, in contact with the solution;
    eliminating the pressure applied to the shirred casing strand and removing any excess liquid smoke from the casing;
    partially drying the coated shirred casing strand; and
    stuffing the partially dried casing with a meat formulation and cooking the resulting encased meat product, thereby producing a meat product with a smoke flavor and brown colored surface.

* * * * *

UNITED STATES PATENT AND TRADEMARK OFFICE
CERTIFICATE OF CORRECTION

PATENT NO. : 4,504,500

DATED : March 12, 1985

INVENTOR(S) : JAMES C. SCHNECK and PATRICK J. FORD

It is certified that error appears in the above-identified patent and that said Letters Patent is hereby corrected as shown below:

Column 8, line 11, change "12" to --2--

*Signed and Sealed this*

*Twenty-fifth* Day of *June 1985*

[SEAL]

*Attest:*

DONALD J. QUIGG

*Attesting Officer*     *Acting Commissioner of Patents and Trademarks*